(12) United States Patent
Kasai

(10) Patent No.: US 10,250,352 B2
(45) Date of Patent: Apr. 2, 2019

(54) OPTICAL RECEIVER AND METHOD OF MONITORING OPTICAL POWER OF OPTICAL SIGNAL INPUT THERETO

(71) Applicant: SUMITOMO ELECTRIC INDUSTRIES, LTD., Osaka (JP)

(72) Inventor: Shinta Kasai, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 30 days.

(21) Appl. No.: 15/346,347

(22) Filed: Nov. 8, 2016

(65) Prior Publication Data

US 2017/0141872 A1    May 18, 2017

(30) Foreign Application Priority Data

Nov. 13, 2015   (JP) ................................. 2015-223294

(51) Int. Cl.
*H04B 10/60*   (2013.01)
*H04J 14/02*   (2006.01)

(52) U.S. Cl.
CPC .......... *H04J 14/0221* (2013.01); *H04B 10/60* (2013.01)

(58) Field of Classification Search
None
See application file for complete search history.

(56) References Cited

U.S. PATENT DOCUMENTS

| 2006/0027736 | A1 | 2/2006 | Ichino et al. | |
| 2006/0263100 | A1* | 11/2006 | Uesaka | H04B 10/0799 398/202 |
| 2006/0280511 | A1* | 12/2006 | Futami | H04B 10/6911 398/209 |
| 2015/0244469 | A1* | 8/2015 | Murayama | H04B 10/691 398/34 |

FOREIGN PATENT DOCUMENTS

| JP | H06-132899 | 5/1994 |
| JP | 2006-054507 | 2/2006 |

OTHER PUBLICATIONS

Draft Standard for Information technology—Telecommunications and information exchange between systems—Local and metropolitan area networks—Specific requirements, IEEE P802.3ba/D3.2, Mar. 24, 2010.
IEEE Standard for Information technology—Telecommunications and information exchange between systems—Local and metropolitan area networks—Specific requirements, IEEE Std 802.3bg-2011.

* cited by examiner

*Primary Examiner* — Kenneth N Vanderpuye
*Assistant Examiner* — David W Lambert
(74) *Attorney, Agent, or Firm* — Smith, Gambrell & Russell, LLP.

(57) ABSTRACT

An optical receiver that receives a wavelength-multiplexed optical signal is disclosed. The optical receiver implements two or more PD elements each receiving an optical signal contained in the wavelength-multiplexed optical signal, a switch that selects one of photocurrents output from the PD (Continued)

elements, an I/V converter that converts the photocurrent into a voltage signal by a variable resistor whose resistance is adjusted for respective photocurrent, and a digital-to-analog converter. The optical receiver estimates the power of the optical signals from look-up-tables correlating the power of the optical signals with the digitally converted photocurrents at the selected resistance of the variable resistor.

8 Claims, 10 Drawing Sheets

OPTICAL RECEIVER AND METHOD OF MONITORING OPTICAL POWER OF OPTICAL SIGNAL INPUT THERETO

BACKGROUND OF THE INVENTION

1. Field of the Invention

The present invention relates to an optical receiver and a method of monitoring optical power of an optical signal input to the optical receiver.

2. Related Background Arts

An optical system often implements an optical receiver capable of operating at a speed of 40 Gbps, or sometimes reaching and exceeding 100 Gbps, in order to solve a bottle neck of communication between servers. The Institute of Electrical and Electronics Engineering (IEEE) has determined a standard for such an optical transceiver by IEEE 802.3ba and IEEE 802.3bg. An optical transceiver following the standard may monitor optical power output therefrom by the function of the digital diagnostic Monitoring (DDM). Specifically, the DDM carries out processes of converting a received optical signal into an electrical signal by a photodiode, converting the electrical signal into a digital form by an analog-to-digital converter, and diagnosing the status of the optical communication and the functions of the optical receiver digitally based on thus obtained electrical signal.

SUMMARY OF THE INVENTION

One aspect of the present application relates an optical receiver module that receives a wavelength-multiplexed optical signal multiplexing two or more optical signals having wavelengths different from each other. The optical receiver module includes an optical receiver, a current-to-voltage converter, and a controller. The optical receiver may implement two or more photodiode and a switch. The photodiodes receive the optical signals and convert the optical signals into photocurrents. The switch may select one of the photocurrents sequentially. The current-to-voltage converter may implement a resistive element having variable resistance. The current-to-voltage converter sequentially converts the one of the photocurrents selected by the switch into a voltage signals by flowing in the resistive element. The controller may determine power of one of the optical signals by the voltage signal.

Another aspect of the present application relates to a method of deciding power of two or more optical signals multiplexed within a wavelength-multiplexed optical signal that enters an optical receiver module implementing two or more photodiodes, a switch, and a current-to-voltage converter that has a resistive element attributed to variable resistance. The method includes steps of: a) converting the optical signals into the respective photocurrents by the photodiodes; b) selecting one of the photocurrents by the switch and setting the resistance of the resistive element in a value corresponding to the one of the photodiodes whose photocurrent is selected by the switch; c) converting the one of the photocurrents into a voltage signal by flowing in the resistive element; and d) deciding the power of the one of the optical signals from based on the voltage signal.

BRIEF DESCRIPTION OF DRAWINGS

The foregoing and other purposes, aspects and advantages will be better understood from the following detailed description of a preferred embodiment of the invention with reference to the drawings, in which.

DESCRIPTION OF EMBODIMENT

Some examples of an optical receiver according to the present invention will be described as referring to accompanying drawings. In the description of the drawings, numerals or symbols same with or similar to each other will refer to elements same with or similar to each other without duplicating explanations. Also, the invention is not restricted to those drawings and will cover all substances, changes, and equivalents fallen within a scope of claims and equivalent thereof.

First Embodiment

Figure 1:
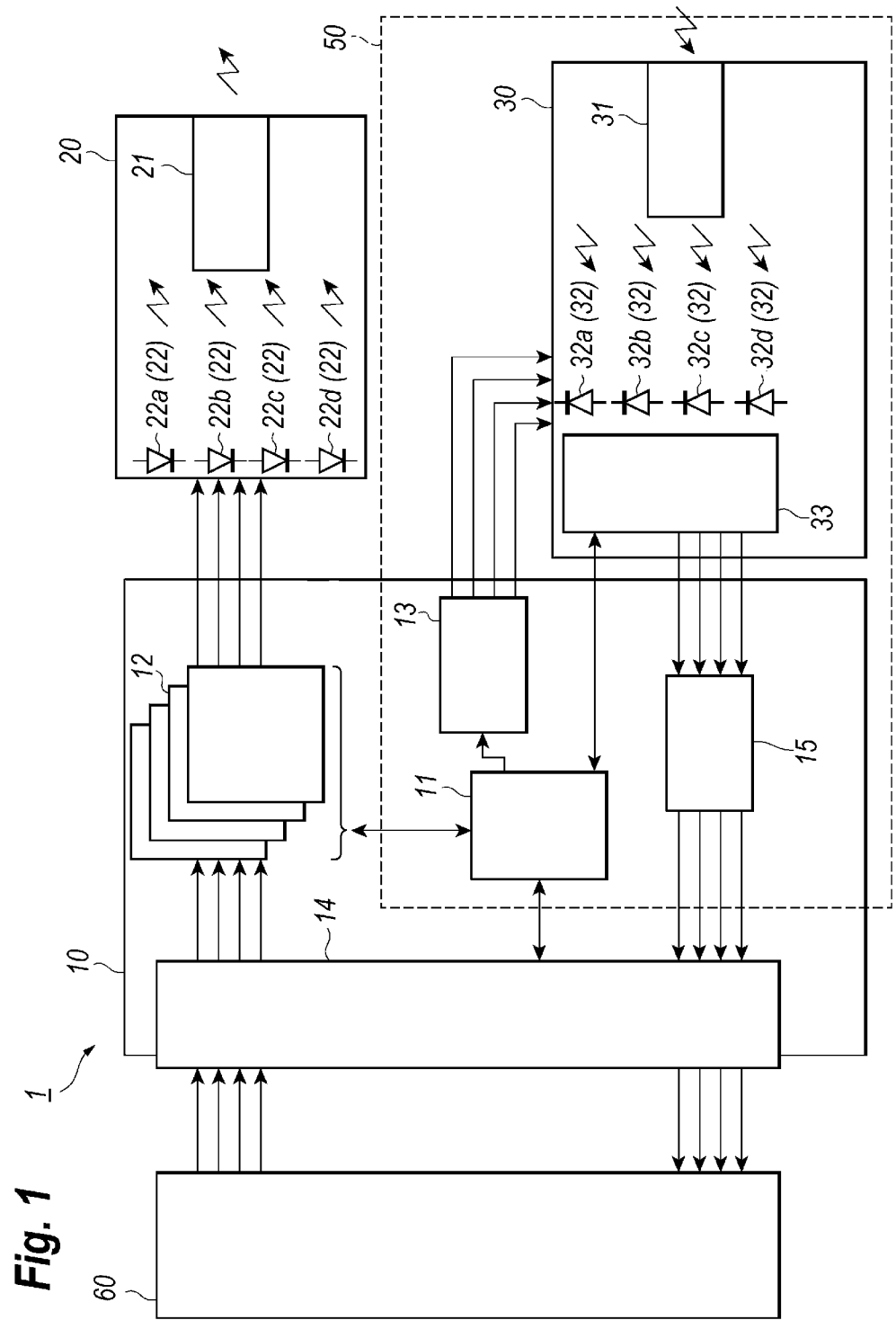
FIG. 1 shows a functional block diagram of an optical module according to embodiment of the present invention.

FIG. 1 shows a functional block diagram of an optical transceiver 1 according to the first embodiment of the present invention. The optical transceiver 1, which is a type of pluggable optical transceiver plugged into or extracted from a host system 60 without turning off the power of the host system, may operate in the full-duplex mode for transmitting and receiving wavelength-multiplexed signals that multiplexes two or more optical signals each having a specific wavelength different from each other in the 1300 nm band. Explanations below concentrates on the optical transceiver operable at 40 Gbps, but the explanation is applicable for another optical transceiver operable at 100 Gbps or higher in a same manner. Such a pluggable optical transceiver, in outer dimensions thereof and electrical specifications for communicating with the host system, is determined by multi-source agreements (MSA) of, what is called, QSFP+ (Quad Small Form Factor Pluggable), CFP (Centum Form factor Pluggable), and so on.

The optical transceiver 1 includes a printed circuit board (PCB) 10, a transmitter module 20, and a receiver module 30. The receiver module 30 converts a wavelength-multiplexed signal with the speed of 40 Gbps, which multiplexes four optical signals, into four electrical signals each having a speed of 10 Gbps, and outputs these four electrical signals. The electrical signals thus generated enter a clock data recover (CDR) circuit 15 at which a clock and data are extracted. The data and the clock thus generated are sent to the host system 60.

The receiver module 30 includes an optical de-multiplexer 31 and a trans-impedance amplifier 33. The optical de-multiplexer 31 de-multiplexes the wavelength-multiplexed optical signal received by the receiver module 30 into respective optical signals having wavelengths of λ1 to λ4. Each of the optical signals has the transmission speed or the transmission rate of 10 Gbps. Because the received wavelength-multiplexed optical signal multiplexes four optical signals each having the transmission speed of 10 Gbps, the receiver module 30 may be operable at the transmission speed of 40 Gbps. The optical de-multiplexer 31 may include by multi-layered dielectric thin films. The optical signals thus de-multiplexed by the optical de-multiplexer 31 enter four photodiodes (PDs) 32.

The PD 32, which includes four PD elements, 32a to 32b, each receiving the optical signals, may generate photocurrents supplied with respective biases. The PD elements, 32a to 32b, may have a type of avalanche photodiode (APD), PIN photodiode, and so on. The trans-impedance amplifier (TIA), which integrates four amplifying elements corresponding to the PD elements, 32a to 32d, into an integrated circuit (IC) converts the photocurrents generated by the PD elements, 32a to 32d, into voltage signals.

The transmitter module 20 outputs a wavelength-multiplexed optical signal by multiplexing four optical signals each having a speed of 10 Gbps into a wavelength-multiplexed optical signal that contains these four optical signals. The transmitter module 20 includes a laser diode (LD) 22 and an optical multiplexer 21. The LD 22 is driven by driving signals provided from drivers 12 through interconnections. The LD 22 integrates four LD elements, 22a to 22d, outputting the optical signals to the optical multiplexer 21, where the optical signals are attributed to wavelengths different from each other. The optical multiplexer 21 generates the wavelength-multiplexed optical signal by multiplexing these four optical signals.

The PCB 10 mounts a controller 11, an LD driver 12, a power supply 13, and an edge connector 14 thereof. The edge connector 14, which is provided in an end of the PCB 10, mates with a socket provided in the host system 60. That is, mating the edge connector 14 with the socket of the host system 60, not only a communication between the host system 60 and the optical transceiver 1 through signal lines may be secured but also electrical power may be supplied to the optical transceiver 1 from the host system 60. The controller 11, which communicates with the host system through the signal lines and the edge connector 14, may control respective units implemented within the optical transceiver 1, where the respective units include the LD driver 12, the power supply 13, the TIA 33, and so on. Also, the controller 11 may transmit and/or receive data through a serial line for controlling and diagnosing the optical transceiver 1. The controller 11, when an anomaly is detected within the optical transceiver 1, sends an alarm to the host system 60, then controls the internal units of the optical transceiver 1 according to commands sent from the host system 60. The controller 11 may be, for instance, a microcontroller, a field-programmable gate array (FPG), and/or a complex programmable logic device (CPLD). The controller 11, when necessary, couples with the transmitter module 20 and the receiver module 30 through control lines to control or diagnose the transmitter module 20 and the receiver module 30 by data sent on the control lines.

The power supply 13 may provide biases to the PD 32 according to control data provided from the controller 11. The biases may be optimized for respective PD elements, 32a to 32d, such that the PD elements, 32a to 32d, show respective optimum sensitivity. The LD driver 12 provides the driving signal to the LD elements, 22a to 22d, according to other control data provided from the controller 11. The driving signals are provided to the LD elements, 22a to 22d, through the interconnections. The LD driver 12 may be a driver IC that includes four driver elements for driving the LD elements, 22a to 22d, independently and concurrently.

Figure 2:
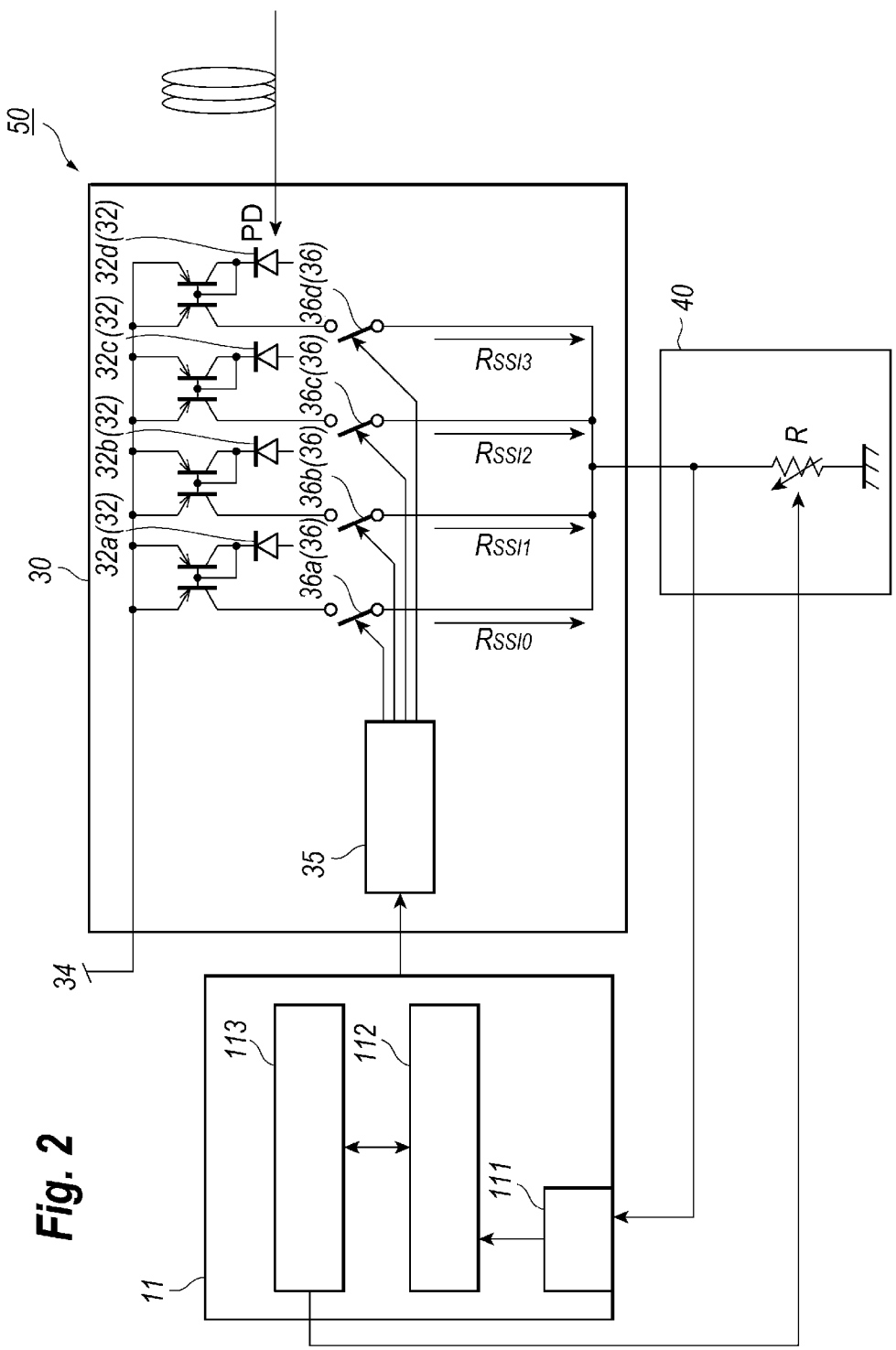
FIG. 2 shows a functional block diagram of an optical receiver implemented within the optical module shown in FIG. 1.

Among respective units within the optical transceiver 1 thus described, the receiver module 30, the controller 11, and an I/V converter 40, which is omitted in FIG. 1 but shown in FIG. 2, constitutes the optical receiver 50. The optical receiver 50 of the present invention may detect power of the optical signals currently received by the optical transceiver 1 through a function of digital diagnostic monitoring (DDM). Statuses of the optical communication and/or those of the optical transceiver 1 may be detected and diagnosed through the power of the optical signals. The optical receiver 50 measures the power of the respective optical signals multiplexed within the wavelength-multiplexed optical signal, and diagnoses the optical transceiver 1 through the measured power of the respective optical signals. Next, details of the optical receiver 50 will be described in referring to FIG. 2.

FIG. 2 shows a functional block diagram of the optical receiver 50. As described above, the receiver module 30 includes four units each corresponding to the optical signals and outputting the electrical signals with the speed of 10 Gbps. FIG. 2 only shows units relating to an evaluation of the power of the optical signals.

The receiver module 30, which is provided with power from the power supply 34, includes the PD 32, a decoder 35, and a switch 36. The PD 32 includes four PD elements, 32a to 32d, whose cathodes are coupled with the power supply 34 through respective current mirror circuits. The PD elements, 32a to 32d, receive the optical signals, which are de-multiplexed by the optical de-multiplexer 31, and generate four photocurrents corresponding to respective optical signals. FIG. 2 omits arrangements concerning to the electrical signals. The current mirror circuits, that receive the photocurrents generated in the respective PD elements, 32a to 32d, reflect thus received photocurrents into respective mirror currents flowing into the switch elements, 36a to 36d. The optical receiver 50 generates the mirror currents from the photocurrents, which are called reference currents of the current mirror circuits and the mirror currents are called monitored currents, and determine the power of the optical signals through the monitored currents. The monitored currents in respective magnitudes thereof may be substantially equal to the magnitude of the photocurrents, namely, the reference currents of the current mirror circuits by setting mirror ratios to be equal to unity. Setting the mirror ratio to be 1/10, then the optical receiver module 30 may estimate the optical power of the optical signals by multiplying the monitored current by 10. The current mirror circuits, 32a to 32d, each outputs one monitored current for one reference current to the switch elements, 36a to 36d.

The decoder 35 and the switch 36 select one of the monitored currents corresponding to the PD elements, 32a to 32d, according to a selection signal provided from the controller 11. The switch 36 includes four switch elements, 36a to 36d, corresponding to the PD elements, 32a to 32d.

The switch 36 cuts all monitored currents, that is, the switch elements, 36a to 36d, are a type of normally-off switch; but select one of the monitored currents corresponding to the one of the PD elements, 32a to 32d, by turning on only one of the switch elements, 36a to 36d. The decoder 35 provides one input coupled to the controller 11 and four outputs coupled to the switch elements, 36a to 36d. The decoder 35 in the input terminal thereof receives the selection signal from the controller 11 and outputs only one of signals to the switch elements, 36a to 36d, depending on the selection signal. For instance, when the selection signal coming from the controller 11 indicates that only the switch element 36a is to be turned on, the decoder 35 asserts only the signal provided to the switch element 36a but negates other signals to the switch elements, 36b to 36d. Thus, the switch element 36a only turns on and the monitored current corresponding to the PD elements 36a flows therein toward the I/V converter 40. Thus, the receiver module 30 implements an RSSI (received signal strength indication) function for only one PD element, which means that for the receiver module 30, it is necessary to prepare only one analog-to-digital converter (A/D-C), details of which will be described later in the specification.

Figure 3:
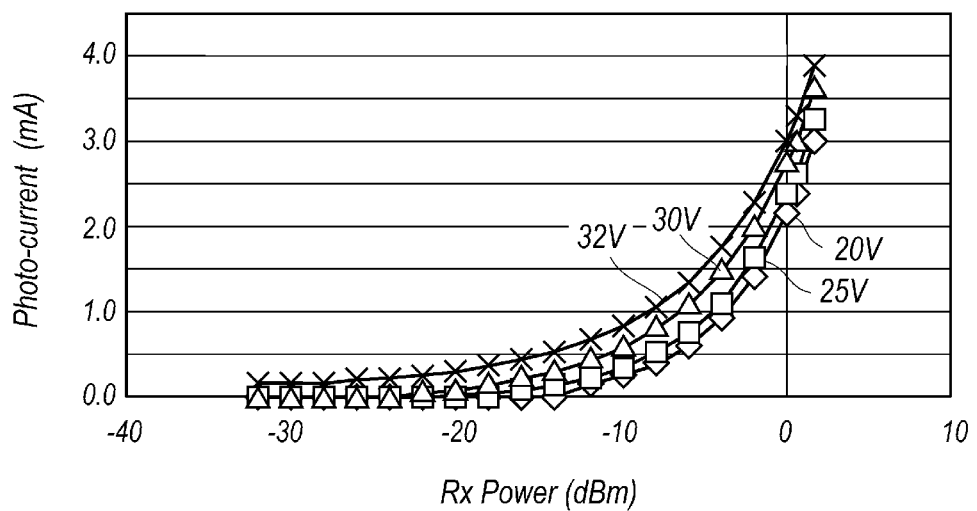
FIG. 3 shows behaviors of photocurrents against optical power generated by a photodiode supplied with various biases.

The I/V converter 40, which includes a resistive element R whose resistance may be variably set, may convert a current signal into a voltage signal, where the current signal is one of the monitored currents selected by the switch 36. The resistive element R of the present embodiment is a type of variable resistor whose resistance may be optionally varied. The resistive element R may cause a voltage drop for the one of the monitored currents flowing therein, where the voltage drop becomes the voltage signal provided to the controller 11. The resistive element R may set the resistance thereof depending on the selection of the monitored currents, or the PD elements, 32a to 32d. PD elements, 32a to 32d, generally show sensitivities specific thereto and different from each other. Moreover, optical paths including the optical de-multiplexer also show losses different from each other depending on a wavelength subject thereto. A PD element of the type of avalanche photodiode (APD) generally shows a magnification co-efficient of 5 to 15 under the preset bias. Because the biases supplied to the PD elements are set so as to optimize the sensitivity of the PD elements, 32a to 32d, even when the optical signals multiplexed within the wavelength-multiplexed signal have power substantially equal to each other; the photocurrents generated by the PD elements, 32a to 32d, namely, the monitored currents resultantly show uneven magnitudes. FIG. 3 shows sensitivities of a PD element under various bias conditions. The horizontal axis corresponds to the power of an optical signal entering the PD element, while, the vertical axis shows a photocurrent generated by the PD. A slope or a differential of respective behaviors corresponds to the magnification coefficient of the PD element.

The losses of the optical paths correspond to the losses from the optical de-multiplexer 31 to the respective PD elements, 32a to 32d, including paths within the optical de-multiplexer 31. Because the optical paths from the input port of the optical de-multiplexer 31 to the respective PD elements, 32a to 32d, are physically different from each other, which inevitably varies the optical losses for the respective PD elements, 32a to 32d. These losses generally show a difference of 1 dB at most. Accordingly, the resistive element R variably sets the resistance thereof depending on the selection of the monitored currents, namely, the PD elements, 32a to 32d.

The controller 11 generates the selection signal that selects one of the monitored currents and estimates the power of the optical signal corresponding to the selected PD elements, 32a to 32d, based on the voltage signal output from the I/V converter 40. The controller 11 includes an analog-to-digital converter (A/D-C) 111, an arithmetic logic unit (ALU) 112, and a selector 113. Because the controller 11 couples with the receiver module 30 through a serial bus, such as an inter-integrated circuit (I2C) bus and a serial peripheral interface (SPI) bus; the selection signal is sent on the serial interface to the receiver module 30.

The A/D-C 111 converts the voltage signal provided from the I/V converter 40 into a digital signal and provides thus converted digital signal to the ALU 112. The A/D-C 111 is coupled with the I/V converter 40 through a signal line independent of the command lines. The A/D-C 111 may be integrated within the controller 11, that is, the controller 11 may be a type of micro-controller implementing one or more analog-to-digital converters. The A/D-C 111 may have a resolution of 10 or 12 bits. The specification assumes that the resolution of the A/D-C 111 is 12 bits.

As described, the I/V converter 40 variably sets the resistance thereof taking the variation of the sensitivities of the PD elements, 32a to 32d, and the optical losses for the PD elements, 32a to 32d. Specifically, an algorithm for setting the resistance of the resistive element will be specifically described as referring to the table below.

TABLE

| Output form A/D-C for R = 1.2 kΩ | | |
|---|---|---|
| Rx power (dBm) | ADC_PD 32a | ADC_PD 32b |
| 1.8 | 1023 | 461 |
| 0.5 | 1023 | 370 |
| 0 | 1023 | 336 |
| −2 | 862 | 230 |
| −4 | 259 | 157 |
| −6 | 401 | 107 |
| −8 | 271 | 72 |
| −10 | 182 | 49 |
| −12 | 120 | 32 |
| −14 | 79 | 21 |
| −16 | 51 | 14 |
| −18 | 33 | 9 |
| −20 | 21 | 6 |
| −22 | 13 | 4 |
| −24 | 9 | 2 |
| −26 | 5 | 1 |
| −28 | 3 | 1 |
| −30 | 2 | 1 |
| −32 | 1 | 0 |

Table 1 shows digital values output from the A/D-C 111 when the receiver module 30 receives the wavelength-multiplexed optical signal with the optical signals having even power, and the I/V converter 40 generates the voltage signals corresponding to the respective power by the resistive element with a fixed resistance of 1.2 kΩ. The respective PD elements, 32a to 32d, are optionally biased to show the respective optimum sensitivity. Because of the scattered optical sensitivity of the PD elements, 32a to 32d, and the varied optical losses also for the respective PD elements, 32a to 32d, the A/D-C 111 generates the digital values widely scattering for the respective PD elements, 32a to 32d, as indicated in the table above; even when the optical signals entering the optical receiver 50 have the even power. The A/D-C 111 of the embodiment has the resolution of 10 bits, which means that a full range is given by 1023 digits. For the first PD elements 32a, the A/D-C 111 may output the overflowed digital value of 1023 digits of the A/D-C 111 for the power equal to and greater than 0 dBm. However, for the second PD elements 32b, the A/D-C 111 generates a digital value of only 44.5% (461/1023) of the full range, which is about half of the former result for the first PD element 32a.

It is preferably to reduce an error of the decision of the power based on the output of the A/D-C 111 within ±1 dB. However, for the second PD elements 32b, it is hard to suppress the error in the decided power within ±1 dB for the optical power of −24 dBm or less, because the A/D-C 111 outputs only 2 bits. The conversion of an analog value into a digital value inherently accompanies with a quantized error of ±1 bit. When the A/D-C 111 resultantly outputs 2 bits, the true value scatters from 1 bit to 3 bits (2±1 bits). That is, when the A/D-C 111 outputs a digital value for the optical signal with substantial power, for instance, 0 dBm, considerably smaller than the full range thereof, the true power of the optical signal is substantially impossible to be determined. Increasing the resolution of the A/D-C 111 from 12 bits to, for instance, 14 bits or 16 bits, a situation described above may be possibly solved. However, such an A/D-C with a higher resolution inevitably enlarges the sizes of the optical receiver 50.

One possible solution is to vary the resistance of the resistive element R, that is, the I/V converter 40 may generate a greater voltage signal when the PD element outputs relatively smaller photocurrent. Specifically, when the controller 11 selects the second PD element 32b above described, the controller also commands the I/V converter 40 to set the resistance of the resistive element R in a value greater than that for the first PD element 32a, that is, greater than 1.2 kΩ. That is resistance by which the I/V converter 40 may generate a maximum voltage signal for the power of the optical signal to be −1.5 dBm.

The ALU 112 provides look-up-tables (LUTs) that correlate the output of the A/D-C 111 to the power of the optical signal corresponding to the currently selected PD elements, 32a to 32d, and determines the practical power based on the LUTs. An example of the LUTs for the first PD element 32a is shown by extracting the first column and the second column in the table above, where the first PD element 32a is biased with 25V and the photocurrent thereof is converted by the resistive element with the resistance of 1.2 kΩ. The ALU 112, which receives information from the selector 113 that selects the switch element 36a, namely, the PD element 32a, and receiving the digital value from the A/D-C 111; may calculate, as referring to the LUT for the PD elements 32a, the practical optical power of the optical signal currently received by the receiver module 30. The LUT may be constructed in a non-volatile memory inherently integrated within the controller 11, or in a memory externally provided from the controller 11.

The selector 113 outputs the selection signal to the decoder 35, by which the decoder 35 may select one of the switch elements, 36a to 36d. The selector 113 may sequentially select the switch elements, 36a to 36d, in this order from the first one 36a to the last one 36d by a period of 10 milliseconds. The selector 113 also provides the set signal to the I/V converter 40 in advance to or concurrently with the selection signal to the decoder 35, where the set signal sets the resistance of the resistive element R to a value corresponding to the selected switch element, namely, the selected PD element. The resistance of the resistive element R may be stored in the non-volatile memory in the controller 11, or in the external memory readable from the controller 11. The selector also notifies the ALU 112 that another PD element is selected. Thus, the ALU 112 may calculate the optical power of the wavelength-multiplexed signal currently received by the optical receiver module 30.

Figure 4:
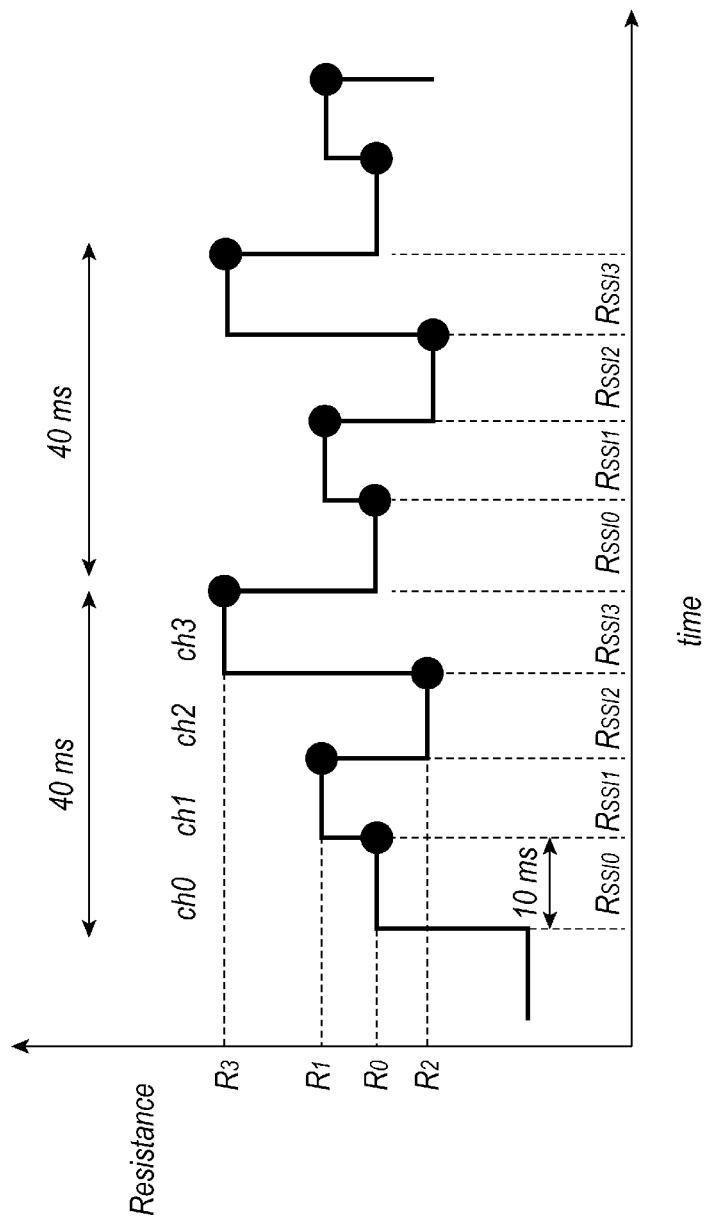
FIG. 4 shows a time chart of resistance selected in the current-to-voltage converter for respective photocurrents selected by the switch.

The operation of the selector 113 for selecting the resistance of the resistive element R will be described as referring to FIG. 4. FIG. 4 schematically illustrates a time variation of the resistance of the resistive element R, where the horizontal axis of FIG. 4 denotes time and the vertical axis thereof shows the resistance. In FIG. 4, the symbol $R_{SSI0}$ denotes a status where the selection signal to the decoder 35 from the controller 11 selects the first PD element 32a and the monitored current corresponding thereto flows in the I/V converter 40. While, the symbols, $R_{SSI1}$ to $R_{SSI3}$, correspond to the statuses where the selection signal selects the monitored currents corresponding to the PD elements, 32b to 32d, and thus selected monitored currents enter the I/V-converter 40. Also, circles in FIG. 4 correspond to instants at which the A/D-C 111 acquires the voltage drops caused in the resistive element R in the I/C converter 40, and symbols, ch0 to ch3, corresponds to the PD elements, 32a to 32d, respectively.

As FIG. 4 indicates, the selector 113 first selects the PD element 32a (ch0), then, the monitored current corresponding to the photocurrent of the PD element 32a enters the I/V converter 40. During such a period $R_{SSI0}$, the selector 113 sets the resistance of the resistive element R to be $R_0$. The I/V converter 40, exactly, the resistive element R, causes the voltage drop by the monitored current flowing therein and provides the voltage signal to the A/D-C 111 in the controller 11. The A/D-C 111 converts this voltage signal into a digital form at the end of the period $R_{SSI0}$. Accordingly, the completion of the conversion by the A/D-C 111 becomes out of the period $R_{SSI0}$. The conversion of the A/D-C 111 typically completes during the next period $R_{SSI1}$. Thus, the ALU 112 determines the power of the optical signal corresponding to the PD 32a at the period subsequent to the period $R_{SSI0}$.

After 10 ms passes from the beginning of the period $R_{SSI0}$, the selector 113 selects the next PD element 32b (ch2) and the resistance of the resistive element R to be a value $R_1$ corresponding to the PD 32b element (ch2), which is greater than the former resistance $R_0$. Then, the monitored current corresponding to the photocurrent of the PD 32b flows in the I/V converter 40, causes the voltage drop in the resistive element R, and the A/D-C 111 begins the conversion. As described, the conversion by the A/D-C 111 completes in a period subsequent to the period $R_{SSI1}$. After 20 ms pass from the beginning of the period $R_{SSI0}$, the selector 113 selects the next PD element 32c and sets the resistance of the resistive element R to be a value $R_2$, which is smaller than the former resistance $R_1$. Then, the monitored current corresponding to the PD element 32c flows in the resistive element R and causes a voltage drop thereby. The A/D-C begins the conversion at the end of the period $R_{SSI2}$. Concurrently with the beginning of the conversion, the selector 113 selects the next PD element 32d and sets the resistance of the resistive element R to be $R_3$. The monitored current reflecting the photocurrent of the PD element 32d flows in the resistive element R to cause a voltage drop thereby. The A/D-C 111 begins the conversion of this voltage drop at the end of the period $R_{SSI3}$, where 40 ms pass from the beginning of the selection of the PD element 32a by the selector 113. Thus, the optical module 30 iterates by a period of 40 ms the procedures of the change of the switch elements, 36a to 36d, namely, the change of the PD elements, 32a to 32d, concurrently with the set of the resistance of the resistive element R, the conversion by the A/D-C 111 of voltage values into digital forms, and the estimation of the power of the respective optical signals multiplexed in the wavelength-multiplexed signal. The change of the new switch element and the conversion of the voltage signal into the digital form accompanied with the estimation of the optical power are concurrently carried out by the controller 11.

Figure 5:
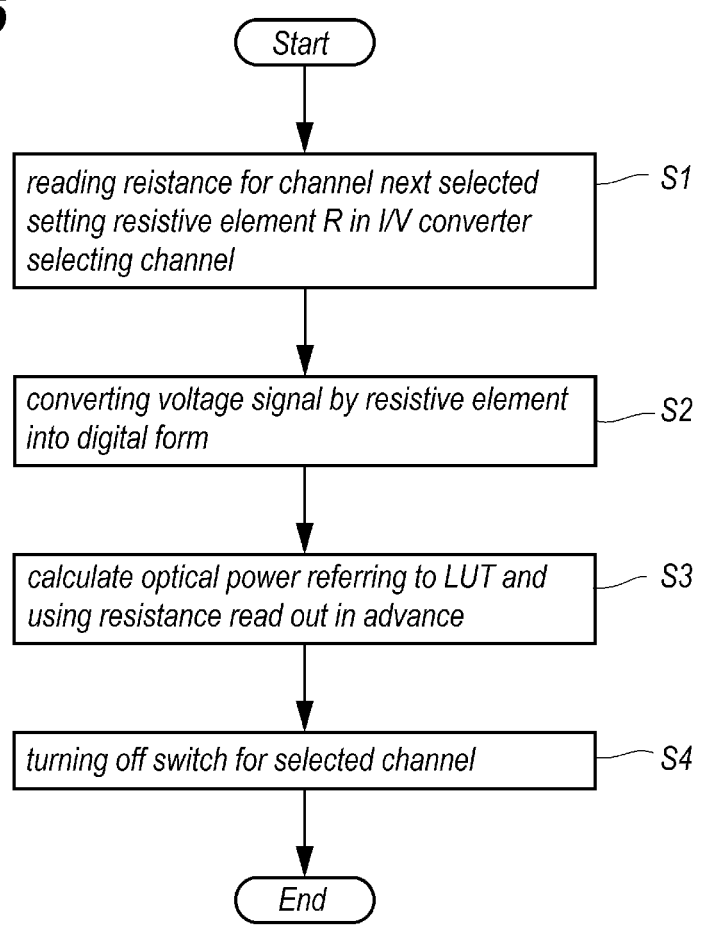
FIG. 5 show a flow chart of procedures for setting resistance of the resistive element in the current-to-voltage converter.

Next, the set of the resistance of the resistive element R by the selector 113 will be described as referring to FIG. 5 which is a flow chart showing the operation of the selector 113. First, the selector 113 sets the resistance of the resistive element R corresponding to one of the PD elements, 32a to 32d, to be selected subsequently. Specifically, reading resistance from, for instance, the non-volatile memory integrated in the controller 11, or externally provided, into a memory to which the ALU 112 promptly accesses. The I/V converter 40 sets the resistance of the resistive element R to be the value the controller reads out. Then, the selector 113 begins the period $R_{SSI}$ at step S1.

One of the PD elements, 32a to 32d, selected at step S1 receives the optical signal and the I/V converter 40 converts the photocurrent of the selected PD elements, 32a to 32d, into a voltage signal. Then, the A/D-C 111 converts the voltage signal into a digital form at step S2. Subsequently, the ALU 112 calculates at step S3 the power of the optical signal using the resistance temporarily stored in the memory and the digital value sent from the A/D-C 111 in referring to the LUT corresponding to the selected channel. Finally, the selector 113 switches the $R_{SSI}$ to the next channel. The steps from S1 to S4 are iterated for the respective channels.

Next, advantages of the optical receiver 50 according to the first embodiment will be described.

Next, advantageous of the optical receiver 50 according to the first embodiment will be described.

Figure 6A:
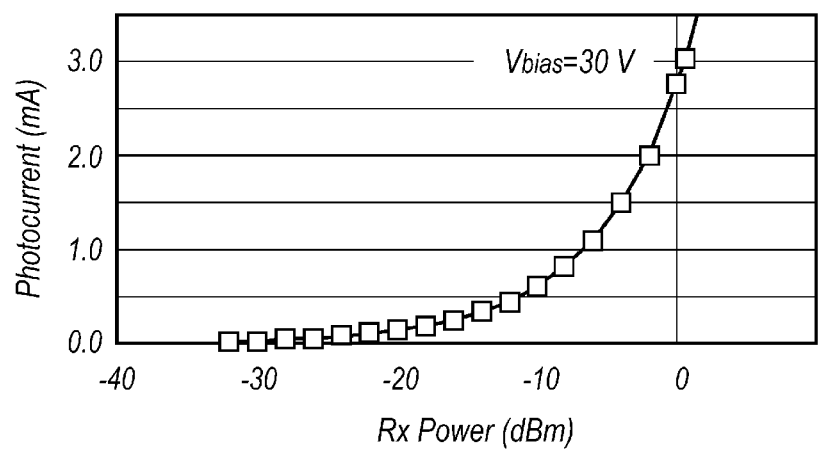
FIG. 6A shows a photocurrent when a photodiode biased with 30 V receives an optical signal having substantial power.
Figure 6B:
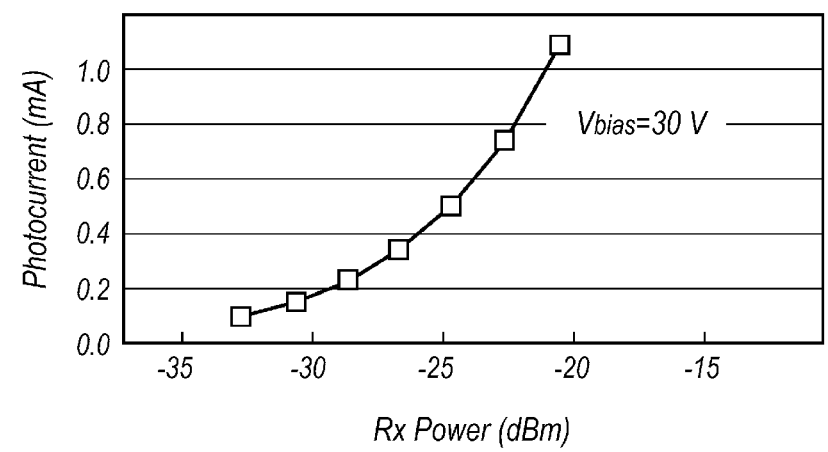
FIG. 6B shows a photocurrent when the photodiode also biased with 30 V but receives an optical signal with relatively reduced power.

The optical receiver 50 of the present embodiment (a) converts the wavelength-multiplexed optical signal, exactly, the optical signals multiplexed in the wavelength-multiplexed signal entering the optical receiver 50, into photocurrents by the PD 32, (b) coverts thus converted photocurrents into the voltage signals by the resistive element R in the I/V converter 40, and (c) converts thus converted voltage signals into the digital signals by the A/D-C 111. The optical receiver 50 may determine the power of the optical signals from thus converted digital signals, the resistance of the resistive element R that is temporarily readout from the memory, and the LUT. The resistance of the resistive element R is variable. That is, magnitude of the voltage signal output from the I/V converter 40 depends on the resistance of the resistive element R. The magnitude of the voltage signal becomes larger as the resistance of the resistive element R becomes larger, that is, the conversion ratio by the resistive element R becomes large. When the wavelength-multiplexed signal has the power of, for instance, in a range from −30 dBm to −20 dBm in FIG. 6A, which is magnified in FIG. 6B, the PD 32 generates a faint photocurrent even when the PD 32 is biased with 30 V.

When such a faint photocurrent is converted in a digital form through the voltage drop at the resistive element R, the converted digital value becomes small enough with respect to the full scale determined by the number of the bits of the A/D-C 111. The conversion into the digital form inevitably accompanies with the quantization error of ±1 bit. When the converted digital signal becomes smaller, the contribution of the quantization error becomes larger. When a photocurrent is small, the voltage drop at the resistive element R becomes large as the resistance thereof is set larger. The increment of the resistance is equivalent to enlarge the vertical scale of FIG. 6A to that of FIG. 6B in a range of the Rx power from −30 to −20 dBm. The increment of the resistance of the resistive element R, which magnifies the voltage drop caused therein makes the increase of the resolution of the A/D-C 111 unnecessary. Thus, the optical receiver 50 is unnecessary to increase the size thereof. The resistive element R having variable resistance thereof may make the optical receiver 50 with a smaller size consistent with the resolution of the detected optical power.

The optical receiver 50, in particular, the controller 11 implemented therein may provide LUTs each corresponding to the respective resistance of the resistive element R. The ALU 112 may evaluate the optical power of the optical signal multiplexed in the wavelength-multiplexed signal using the one of LUTs, the resistance corresponding to the one of the LUTs, and the digital value converted from the voltage signal generated in the I/V converter 40. The procedures for determining the optical power using the LUT may be easily done within the controller 11. Varying the resistance of the resistive element R, a relation between the optical power and the digital value is also changed. However, various LUTs each corresponding to respective resistance may determine the optical power with satisfactory resolution.

Also, the optical receiver module 30 implements a plurality of PD elements. The resistance of the resistive element R is variably set corresponding to the respective PD elements. The PD elements generally show a sensitivity specific thereto and different from each other. Accordingly, selecting the resistance of the resistive element R adequately to the respective PD elements, the power of the optical signals multiplexed in the wavelength-multiplexed signal may be estimated with satisfactory resolution.

Second Embodiment

Next, another optical receiver according to the second embodiment of the present invention will be described as referring to FIGS. 7 to 9. The optical receiver of the second embodiment has arrangements similar to those of the first embodiment but the arrangement and the function of the I/V converter 40 and the controller are different. When the optical power of the optical signals are less than a preset reference, which means that one or more failures occur, the controller 11 sends an alarm to the host system 60. The preset reference may be, for instance, −28 dBm. On the other hand, the optical receiver may digitally evaluate the optical power of the optical signals in the range of −1.5 to −24 dBm within an acceptable quantized error. The optical signal with the power thereof less than −24 dBm possibly accompanies with quantized errors. Accordingly, when the controller 11 determines the optical power to be less than −24 dBm, the controller 11 is unable to decide whether the alarm should be sent to the host system 60.

The optical receiver of the second embodiment may change two modes of the determination of the optical power, that is, one of the modes determines the input power of the optical signal, while, the other decides whether the alarm is set or not. Details of the I/V converter 40 and the controller 11 of the second embodiment will be next described.

The I/V converter 40 may set the resistance of the resistive element R in two ways for respective PD elements, 32a to 32d, one of the ways is for the normal measurement, while, the other is for the fine measurement. The former mode of the resistance, as described in the first embodiment, is set taking the sensitivities of the PD elements, 32a to 32d, and optical losses for the respective optical paths. The resistance thus selected may secure the quantized error of about ±1 dB caused in the A/DC 111 for the optical power of −1.5 dBm to −24 dBm. On the other hand, the resistance of the latter mode is typically one digit greater than that of the former resistance; specifically, the resistance of the latter mode multiplies by 10 to 15 the resistance of the former mode, that is, by which the A/D-C 111 may convert the voltage signal from the I/V converter 40 by the quantized error within ±1 dB for the optical power of −24 to −28 dBm.

The selector 113 in the controller 11 outputs the selection signal that selects one of the PD elements, 32a to 32d, in a preset order; concurrently, outputs to the I/V converter 40 a command to select the resistance of the resistive element R. Specifically, the controller 11, when the PD elements 32a is to be selected, first sends the command to the I/V converter 40 to select the resistance of the resistivity element R to be an ordinary resistance of the PD elements 32a. Then, when the measured power by the ordinary resistance is less than the threshold, for instance, −24 dBm, the selector 113 sends the command to the I/V converter 40 to set the resistance of the resistive element R to be that of the precise measurement for the PD elements 32a.

The setting of the resistance of the resistive element R will be explained as referring to FIG. 7, which shows a time variation of the resistance of the resistive element R, where the horizontal axis shows time and the vertical axis corresponds to the resistance to be set in the resistive element R. A symbol nH in FIG. 7 shows the resistance of the resistive element R to be set for respective PD elements, 32a to 32d, in the normal mode and another symbol nL shows the resistance to be set for respective PD elements, 32a to 32d, in the precise mode. The symbols nH and nL are different from each other depending on the PD elements, 32a to 32d; but FIG. 7 sets those resistances, nH and nL, equal to each other for the sake of convenience. In FIG. 7, symbols, $R_{SSI0}$ to $R_{SSI3}$, correspond to statuses where the PD elements, 32a to 32d, are selected and the monitored current corresponding to the selected PD elements, 32a to 32d, enter the I/V converter 40. Also, the A/D-C 111 converts the voltage signal of the precise mode at the instance denoted by the filled circles, while, the A/D-C 111 also converts the voltage signal of the normal mode and the controller 11 decides whether the converted voltage signal is less than the threshold at the instance denoted by the open circles.

Figure 7:
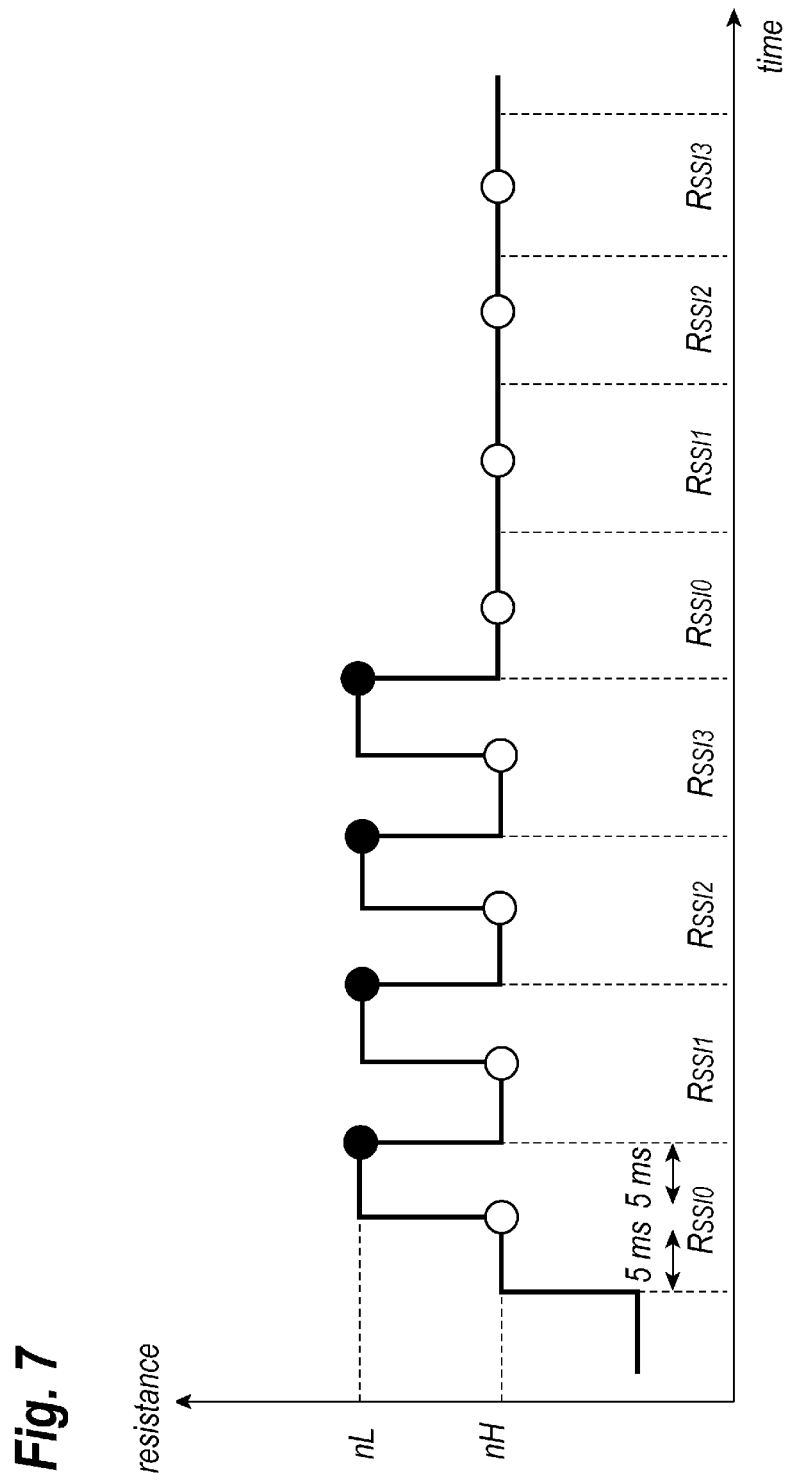
FIG. 7 shows a time chart of resistance varying in two levels for the one of the photocurrents.

As shown in FIG. 7, when the selector 113 first selects the PD element 32a, the monitored current corresponding to the selected PD element 32a enters the I/V converter 40. The resistance of the resistive element R is set to be a value nH of the normal mode. The controller 11 estimates the power of the optical signal entering the PD element 32a, and changes the resistance of the resistive element R to a value of the precise mode when the estimated power is less than the threshold. The controller carries out those procedures from the selection of the PD element 32a and the setting of the resistance in the normal mode to the change of the resistance to the precise mode within 5 ms. Subsequently, the controller estimates the power of the optical signal entering the PD elements 32 by the resistance of the resistive element in the precise mode. The controller 11 finishes the estimation of the optical power within 5 ms from the change of the resistance of the resistive element R. When the controller 11 decides that the optical power is greater than the threshold at the first estimation, the controller 11 does not change the resistance of the resistive element R.

Figure 8:
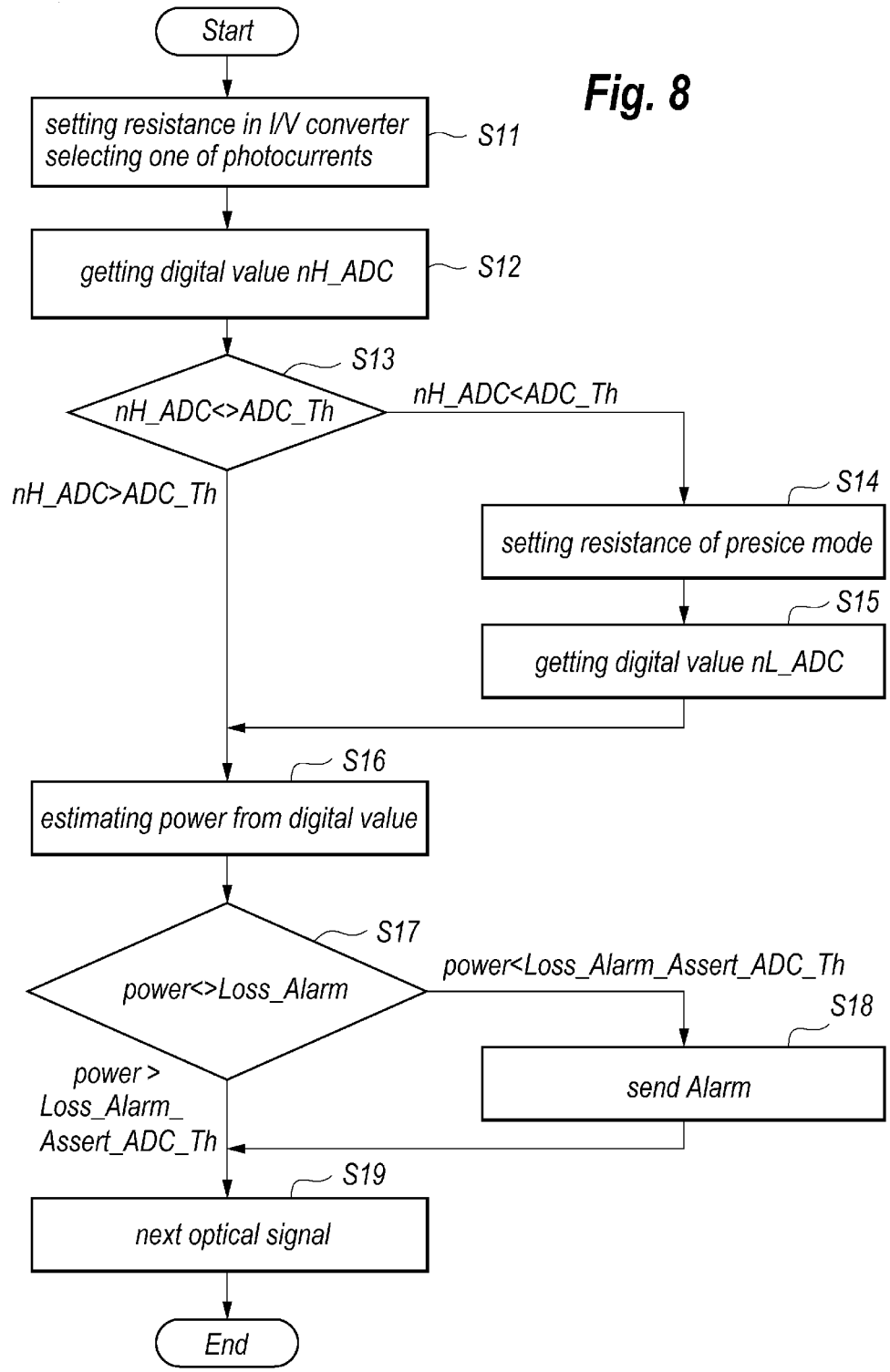
FIG. 8 shows a flow chart of the process for setting the resistance according to the second embodiment of the present invention.

The change of the resistance of the resistive element R will be further described as referring to FIG. 8 which is a flow chart of the procedure of the change of the resistance. First, the selector 113 sets the resistance for the PD element 32n (n=0 to 3) in the respective normal mode, and the procedure for the PD element starts at S11. That is, the selector 113 sends a command to the I/V converter 40 to set the resistance nH in the normal mode corresponding to the selected PD element.

The I/V converter 40 receives the monitored current corresponding the selected PD element through the current-mirror circuit, and generates a voltage signal corresponding to the voltage drop caused in the resistive element R by the monitored current. The A/D-C 111 converts this voltage signal into a digital signal nH_ADC at step S12. Then, the controller 11 decides whether the digitally converted signal nH_ADC is greater than the preset threshold ADC_Th at step S13. When the digital signal nH_ADC is less than the threshold nH_ADC, the selector 113 sends a command to change the resistance to that nL in the precise mode at S14. The resistance nL in the precise mode is about that nH in the normal mode multiplied with 10 to 15. Then, the A/D-C 111 outputs a new digital value nL_ADC by converting the voltage drop caused in the resistive element R whose resistance is thus changed at step S15.

The ALU 112 determines the power of the optical signal by the digital signal thus output from the A/D-C 111 and the LUT corresponding to the selected PD element at step S16. The digital signal is the value nL_ADC when the comparison at step S13 decides that the first digital signal nH_ADC is less than the threshold ADC_Th, while, the value nH_ADC when the comparison decides that the first digital signal nH_ADC is greater than the threshold ADC_Th.

Next, the controller 11 decides whether thus evaluated power of the optical signal is less than an alarm threshold Loss_Alarm_Assert_ADC_Th at step S17. When the controller 11 devices the power is less than the Loss_Alaram_Assert_ADC_Th, the controller 11 outputs an alarm to the host system 60 at step 18, and completes the procedure $R_{SSI}$. Subsequently, the procedures same with above described are performed for the rest PD elements. Thus, the controller 11 may decide whether the power is less than the threshold for the respective optical signals independently. Also, when the first comparison whether the output of the A/D-C 111 is less than the threshold ADC_Th decides that the output is not less than the threshold, the controller 11 does not send the command to change the resistance; the response in the normal mode may be shortened.

Figure 9:
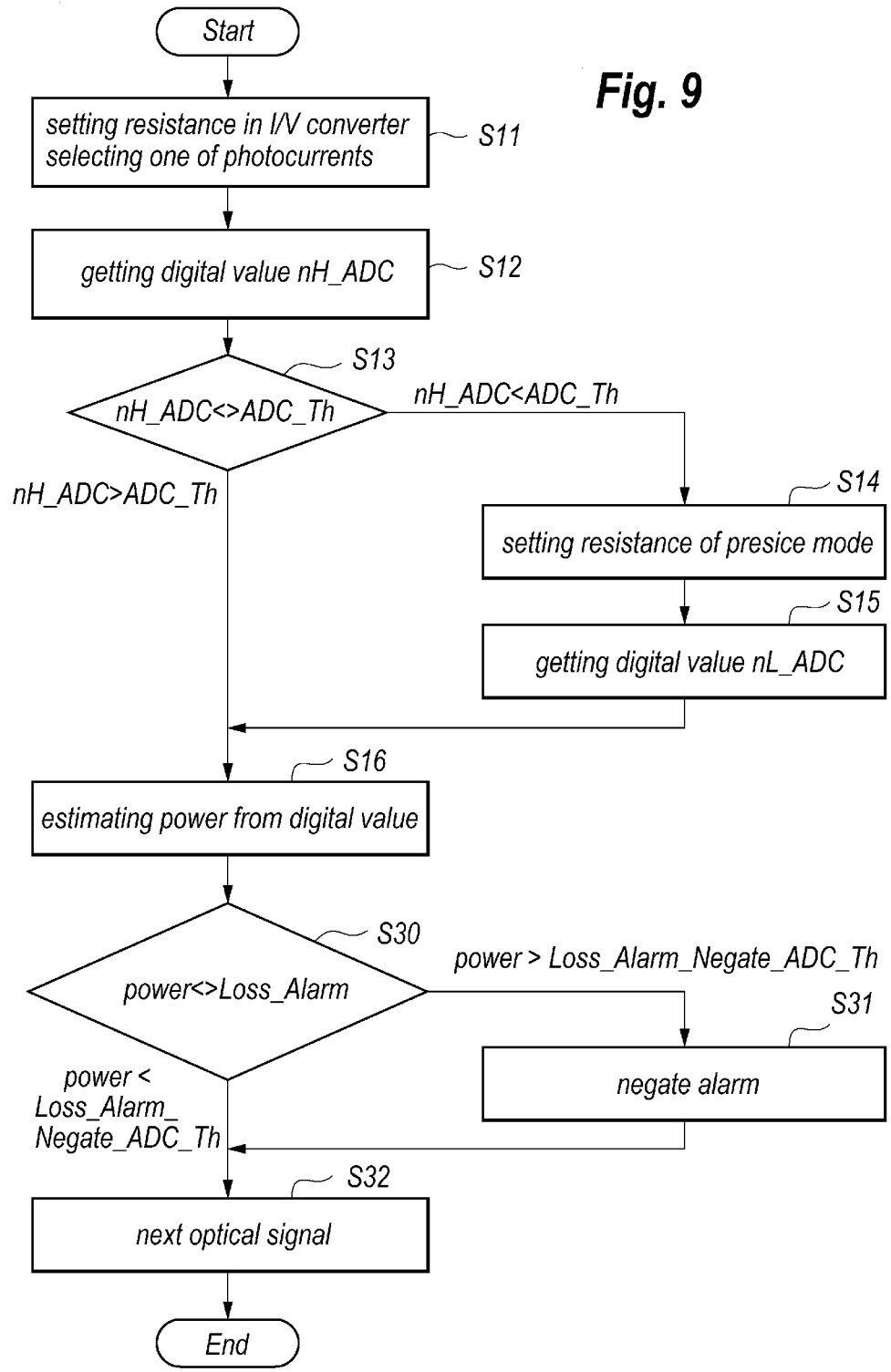
FIG. 9 shows a flow chart of the process for negating the alarm once set in previous processes.

When the controller 11 asserts the alarm and decides that the alarm should be released by the procedures shown in FIG. 9, the controller 11 may negate the alarm. Specifically, under the condition where the alarm is asserted, the controller 11 performs the procedures S11 to S16 shown in FIG. 8 and compares the estimated power with another threshold Loss_Ararm_Negate_ADC_Th at step S30. When the estimated power exceeds the threshold Loss_Alarm_Negate_ADC_Th, the controller negates the alarm at step S31; then finishes the period $R_{SSI}$ and performs the procedures same with above described for the next PD elements.

The optical receiver of the second embodiment may doubly set the resistance of the resistive element R, that is, one of which is the resistance nH for the normal mode and the other is the resistance nL for the precise mode, where the latter resistance nL is greater than the former resistance nH. The former resistance nH may be determined such that the quantized error to be within ±1 dB for the power of the optical signal from −1.5 dBm to −24 dBm. When the converted digital value is the threshold ADC_Th, the controller 11 changes the resistance of the resistive element R to that nL in the precise mode.

When the controller 11 asserts the alarm, the controller 11 is necessary to decide whether the optical power exceeds −28 dBm or not. However, when the resistance is set in that nH of the normal mode and the converted digital value becomes less than that corresponding to the power of −28 dBm; such a digital value possibly includes a large quantized error, where the ALU 112 may not estimate the power of the optical signal exactly and the controller 11 may be decide whether the alarm should be sent to the host system 60. By switching the resistance from that nH of the normal mode to that nL of the precise mode, which is greater by 10 to 15 than the former and the I/V converter 40 may generate a greater voltage signal, the ALU 112 may reliably estimate the power of the optical signal, and the controller 11 may securely output the alarm to the host system 60.

The optical receiver 50 of the embodiment receives the wavelength-multiplexed optical signal containing two or more optical signals. Those optical signals are evenly affected by the optical loss due to one optical fiber. Accordingly, when the controller 11 decide that the resistance of the resistive element R is necessary to be changed to that nL in the precise mode from that nH in the normal mode for one of the optical signals, the controller 11 may set the resistance in that nL in the precise mode from the beginning of the procedures for the optical signals subsequent the procedure for the optical signal for which the resistance is set in that nL of the precise mode. The algorithm thus described, that is, the controller 11 may omit the procedure for the resistance in the normal mode and shorten the time to decide whether the alarm is asserted or not.

Figure 10:
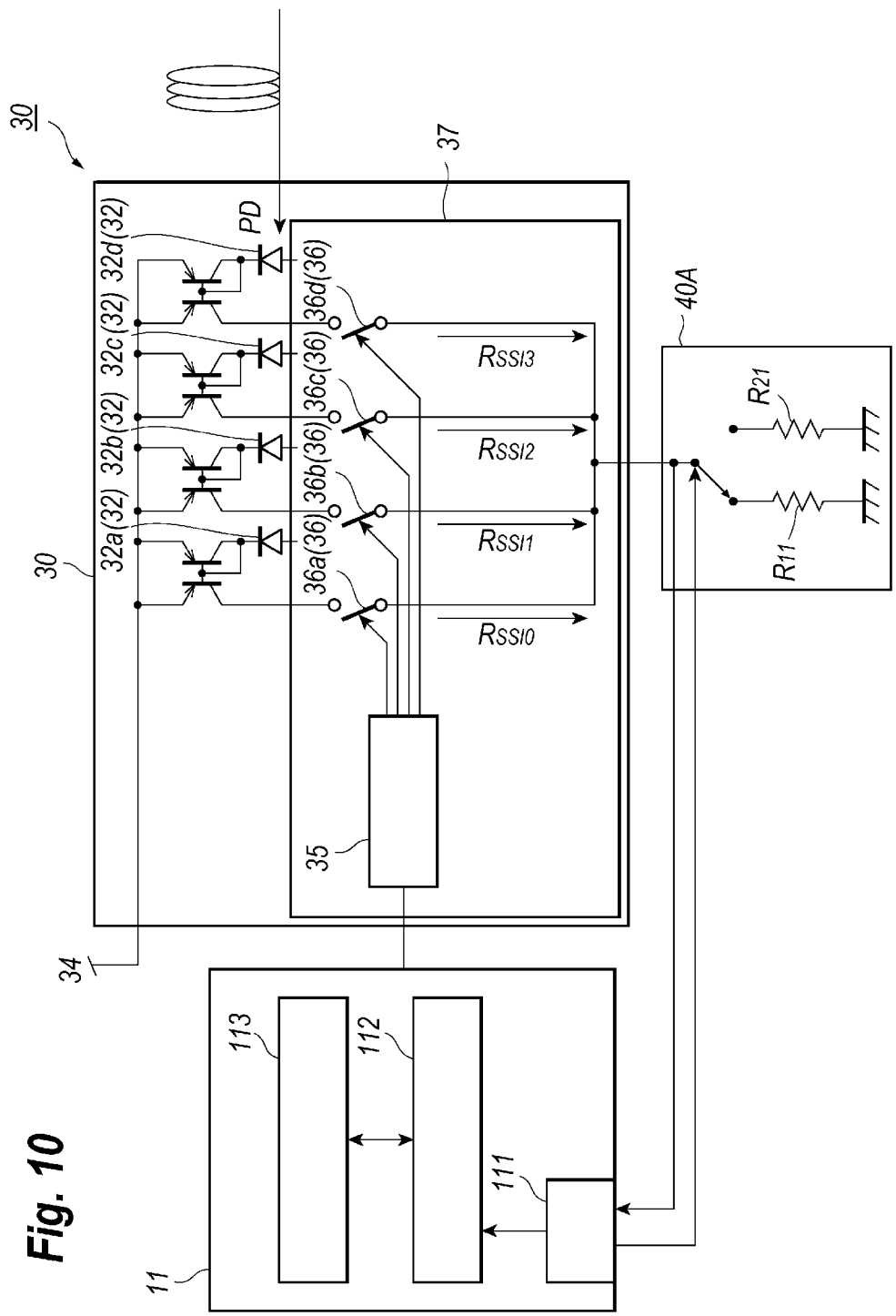
FIG. 10 shows a functional block diagram of an optical receiver having an arrangement modified from the arrangement shown in FIG. 2

While particular embodiment of the present invention has been described herein for purposes of illustration, many modifications and changes will become apparent to those skilled in the art. For instance, the description above concentrates on an arrangement where the I/C convert 40 provides a variable resistive element R, but the invention is not restricted to those arrangement. That is, as FIG. 10 illustrates, the I/V converter 40A may implement two or more resistors, $R_{11}$, $R_{21}$, or more, and an analog switch that may select one of the resistors, $R_{11}$ and $R_{21}$. Those arrangements are equivalent to the arrangement where the I/V converter 40 implements the variable resistor. Also, the description concentrates on the arrangement where the optical receiver 50 implements four PD elements, 32a to 32d. However, the number of the PD elements, 32a to 32d, fully depends on the number of optical signals contained in the wavelength-multiplexed optical signal. When the wavelength-multiplexed optical signal contains only one optical signal, the optical receiver 50 implements only of PD element and omits the switch 36. A function to change the resistance of the resistive element R between that nH in the normal mode and that nL in the precise mode is necessary to implement. Accordingly, the appended claims are intended to encompass all such modifications and changes as fall within the true spirit and scope of this invention.

The present application claims the benefit of priority of Japanese Patent Application No. 2015-223294, filed on Nov. 13, 2015, which is incorporated herein by reference.

I claim:

1. An optical receiver that receives a wavelength-multiplexed optical signal multiplexing two or more optical signals having wavelengths different from each other, the optical receiver comprising:
   an optical receiver module including two or more photodiodes and a switch, the photodiodes converting the optical signals into photocurrents, the switch sequentially selecting the photocurrents for output by the optical receiver;
   a current-to-voltage converter that includes a resistive element having variable resistance, the resistive element causing voltage drops corresponding to the photocurrents output from the optical receiver and flowing therein; and
   a controller that controls the switch to sequentially select the photocurrents to evaluate power of the optical signals by the voltage drops, and that sets the variable resistance to one of a first resistance and a second resistance, the second resistance being 10 to 15 times greater than the first resistance,
   wherein the current-to-voltage converter converts the photocurrents by the second resistance of the resistive element when at least one of the voltage drops generated by the first resistance is less than a preset voltage, and
   wherein, when the current-to-voltage converter once sets the variable resistance of the resistive element to the second resistance for one of the photocurrents, the current-to-voltage converter generates the voltage drops by setting the variable resistance in the second resistance for the rest of the photocurrents.

2. The optical receiver of claim 1,
   wherein the controller provides look-up-tables each correlating the power of the optical signals with the voltage drops derived from the photodiodes through the photocurrents and the variable resistance of the resistive element.

3. The optical receiver of claim 2,
   wherein the controller includes an analog-to-digital converter that sequentially converts the voltage drops into digital signals, and
   wherein the variable resistance of the resistive element is set such that the analog-to-digital converter shows a quantized error within a preset range.

4. A method of determining power for two or more optical signals multiplexed in a wavelength-multiplexed optical signal, the wavelength-multiplexed optical signal entering an optical receiver that includes two or more photodiodes, a switch, and a current-to-voltage converter that includes a resistive element having variable resistance, the method comprising steps of:
   concurrently converting the optical signals into photocurrents by the photodiodes;
   sequentially selecting the photocurrents to flow in the resistive element by the switch;
   setting the variable resistance of the resistive element to a value determined for each photodiode whose photocurrent is selected by the switch;
   sequentially generating a voltage drop for each selected photocurrent flowing in the resistive element; and
   sequentially determining the power of each respective optical signal from the voltage drop corresponding to said each respective optical signal,
   wherein, in the step of sequentially generating a voltage drop, when the variable resistance is set to a first resistance and one of the voltage drops becomes smaller than a preset voltage, a step of converting the photocurrent corresponding to said one voltage drop is carried out by setting the variable resistance to a second resistance that is 10 to 1.5 times greater than the first resistance, and
   wherein, in the step of sequentially generating a voltage drop, the rest of the photocurrents are converted with the variable resistance set in the second resistance once the current-to-voltage converter has set the variable resistance of the resistive element to the second resistance for the photocurrent corresponding to said one voltage drop.

5. The method of claim 4, wherein the optical receiver further provides look-up-tables each correlating the voltage drops with the power of the respective optical signals derived from the photodiodes through the photocurrents and the variable resistance of the resistive element, and wherein the step of determining the power includes a step of sequentially comparing one of the voltage drops with one of the look-up-tables corresponding to one of the photocurrents selected by the switch.

6. The method of claim 5, wherein the optical receiver further includes a digital-to-analog converter that sequentially converts the voltage drops into respective digital signals, and wherein the method further includes a step of determining the variable resistance of the resistive element for the photocurrents selected by the switch such that the analog-to-digital converter shows a quantized error within a preset range.

7. The optical receiver of claim 3, wherein the preset range of the quantized error is ±1 dB for power determined from the voltage drops from −24 to −1.5 dBm.

8. The method of claim 6, wherein the preset range of the quantized error is ±1 dB for power determined from the voltage drops from −24 to −1.5 dBm.

* * * * *